Aug. 16, 1932.  S. OPPENHEIMER  1,871,464

SAUSAGE CASING

Filed March 12, 1932

Inventor:
Seymour Oppenheimer
By Rector, Hilbren, Davis & Macauley Attys.

Patented Aug. 16, 1932

1,871,464

UNITED STATES PATENT OFFICE

SEYMOUR OPPENHEIMER, OF CHICAGO, ILLINOIS, ASSIGNOR TO OPPENHEIMER CASING COMPANY, OF CHICAGO, ILLINOIS, A CORPORATION OF ILLINOIS

SAUSAGE CASING

Application filed March 12, 1932. Serial No. 598,383.

My invention relates to casings formed from animal intestines which are customarily filled with meat of various kinds to form sausages, bolognas, and the like, and more particularly to a novel arrangement for incorporating therewith a label bearing suitable printing or other indicia.

One object of my invention is to devise a sausage casing having a label which is completely shielded from the meat filler, and is also protected against abrasions due to handling so that the label will remain in position until the sausage or bologna is consumed.

A further object is to provide an article of the character indicated composed of a pair of concentric casings, with the label interposed therebetween, the printing on the label being fully visible owing to the semi-transparency of the outer casing.

In the marketing of bologna, tongue-sausages and similar types of sausage products which are enclosed by casings, it is commercially desirable that the products carry a label or other device indicating its trademark, brand, name of proprietor, or similar insignia, and that this label be affixed directly to the casing by some means other than a string attached tag. It is well known that the best sausage casings are made from animal intestines because of their native capacity for permitting a "breathing" of the meat filling. Their natural moist condition, however, precludes the use of stamps or other devices for applying a printed design directly to the casing, as is possible with the cellophane or artificial casing, so that the intestine type of casing is characterized by an inherent disadvantage from the standpoint of carrying brand marks and the like.

The present invention is intended to solve this problem by incorporating in the casing when it is manufactured a label in the form of a sheet of ordinary paper, cellophane, parchment paper, or generally any form of insert that will satisfactorily take ink. In the lined type of casing, to which this invention more particularly relates, the label is interposed between the pair of casings, so that it is protected from actual contact with the meat by the inner casing, while the outer casing forms a protection against the hazards of handling.

These and further objects of my invention will be set forth in the following specification, reference being had to the accompanying drawing, and the novel means by which said objects are effectuated will be definitely pointed out in the claims.

Figure 1:
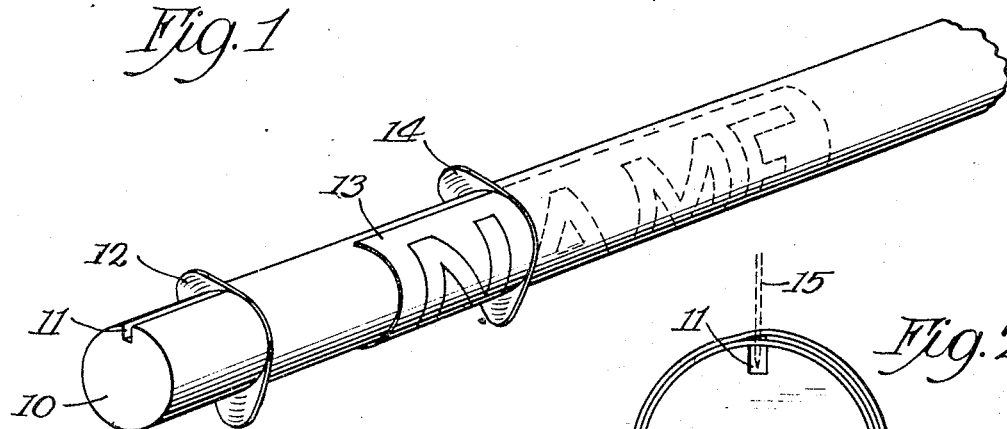
Figure 1 is a perspective view showing the initial step in the manufacture of my improved casing.
Figure 2:
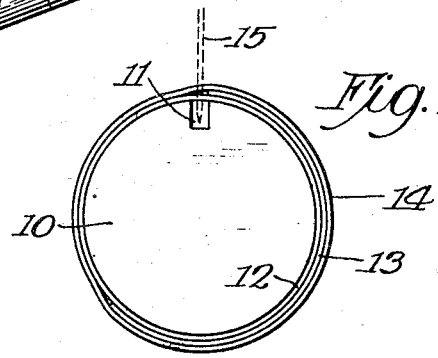
Fig. 2 is an end view of the mandrel or arbor shown in Fig. 1, the concentric pair of casings being indicated in position thereon and in process of being slitted in the customary manner.

Referring to Fig. 1, the numeral 10 indicates a round stick having a longitudinal groove 11, which is customarily used in the casing industry as an arbor or mandrel to receive the animal intestines which are drawn thereover in order to build up the completed casing. Specifically, an intestine 12, which is in the form of a sleeve, is first drawn over the stick 10 and a label 13, bearing appropriate indicia, is applied directly to the external surface of the sleeve. The label 13 is printed on one side thereof only and the material composing the label is preferably of a type that will prevent any soaking of the ink therethrough. A second sleeve or intestine 14 is then drawn over the sleeve 12, including the label 13, so that the stick 10 is encased by a pair of concentric sleeves with a label interposed therebetween.

Figure 3:
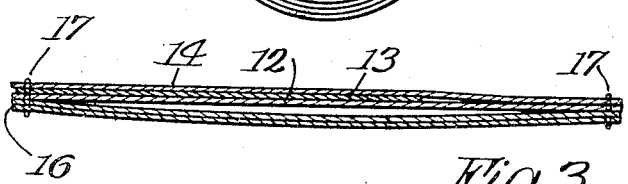
Fig. 3 is a cross sectional view of a pile of superimposed casing sheets, which constitute the third step in the manufacture of the casings, the indicated sheets being illustrated as attached along their edges by sewing threads.

A knife 15 is then inserted in the groove 11 and drawn along the stick 10 to completely sever the concentric sleeves 12 and 14, so that they form a pair of superimposed sheets with the label 13 therebetween. In a similar manner, an additional pair of intestines is then placed upon the stick 10 and subsequently slitted in order to provide the simple pair of superimposed sheets 16, as indicated in Fig. 3. In this instance, a label is not inserted between the pair of sheets 16, although this action will be a matter of choice by the manufacturer of the casing.

Figure 4:
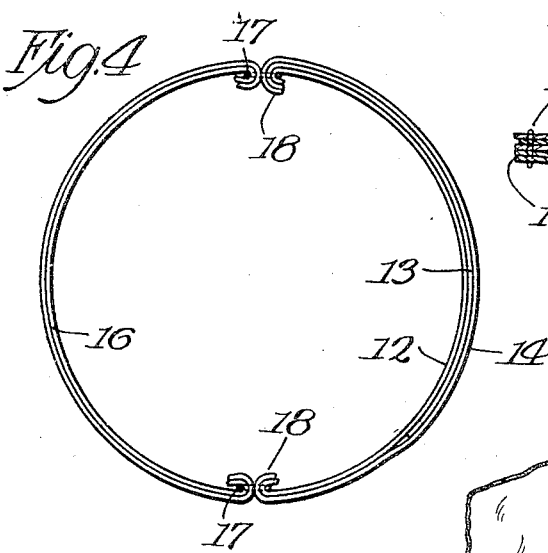
Fig. 4 is a cross sectional view of the completed casing in expanded condition.

The two sheets, formed from the sleeves 12 and 14, together with the intervening label 13, are then superimposed upon the pair of sheets 16 and the pile of sheets thus formed is then sewn along the edges of the sheets by attaching threads 17, the sewing threads preferably extending along the sides and one end of the pile, leaving one end open to receive the meat filling. As shown in Fig. 3, the casing occupies a flattened and reversed position and it is only necessary to turn the casing inside out, as indicated in Fig. 4, thus placing the free ends 18 of the seams within the casing and presenting a clean, finished exterior. As illustrated in Figs. 1 and 3, one edge of the label 13 may be arranged adjacent a side edge of each of the sleeves 12 and 14, or more properly, the sheets formed from these sleeves, so that when the attaching threads 17 are sewn through the pile of superimposed sheets, these threads will also form an attachment with the label 13.

Figure 5:
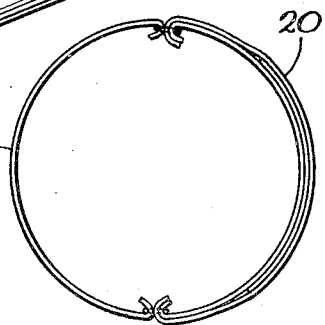
Fig. 5 is a view similar to Fig. 4, but differing therefrom in that the left half of the casing is formed from a single thickness of intestine, to form, a partially lined casing.

In Fig. 5, which illustrates a modified arrangement of the casing sections in a partially lined casing, the right section 20 of the casing is substantially the same as that shown in Fig. 4, except that the label is held in position by the moist, sticky character of the intestine material. The left section 21 is made from a single intestine and so has only a single thickness. A casing of this type may be desirable where strength reinforcement is a secondary consideration.

Figure 6:
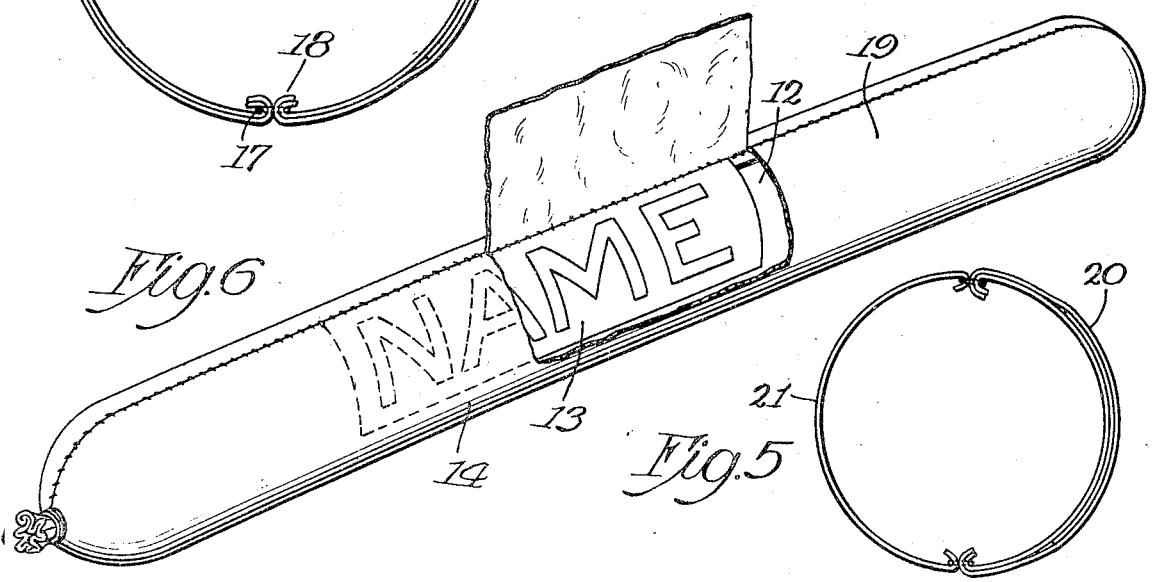
Fig. 6 is a perspective view of a filled casing, such as a bologna, a portion of the external sleeve of the casing being lifted to expose the label therebeneath.

In Fig. 6 is illustrated a filled casing, with a portion of the outer sleeve thereof lifted to expose a portion of the label. Owing to the semi-transparent condition of the outer portion of the casing, it will be obvious that the interposition of the label between a pair of the sleeves does not interfere with its easy observation. Moreover, the label does not affect in any manner the meat filler and it is also protected from abrasions, due to handling, by the outer part of the casing.

It will be understood that the application of the present invention is not limited to casings of the sewn type for it is obvious that the intestines and label, after assembly on the stick, could be removed without slitting, thus forming an open end casing.

I claim:

1. A sausage casing of the lined type comprising a pair of close-fitting sleeves, and label means positioned between said sleeves and externally visible through the outer sleeve.

2. A sausage casing comprising a plurality of superimposed sheets sewn along certain edges thereof and separable between the intermediate sheets to receive a filling of meat, and label means positioned between a pair of the outer sheets and externally visible through the outermost sheet.

3. A sausage casing comprising a plurality of superimposed sheets sewn along certain edges thereof and separable between the intermediate sheets to receive a filling of meat, and label means positioned between a pair of the outer sheets and held in position by the threads securing said sheets together and externally visible through the outermost sheet.

4. A sausage casing of the lined type comprising a pair of close-fitting sleeves, and label means in the form of a sheet of paper, positioned between said sleeves and externally visible through the outer sleeve.

5. A sausage casing comprising a sleeve, a part sleeve portion attached thereto externally of said sleeve, and label means positioned between said sleeves and portion and externally visible through said portion.

In testimony whereof, I have subscribed my name.

SEYMOUR OPPENHEIMER.